(12) United States Patent
Laird et al.

(10) Patent No.: US 10,992,594 B2
(45) Date of Patent: Apr. 27, 2021

(54) OPTIMIZATION OF NETWORK RESOURCES

(71) Applicant: HOMEADVISOR, INC., Denver, CO (US)

(72) Inventors: John Casey Laird, Lakewood, CO (US); David Paul Zeckser, Denver, CO (US); William Brandon Ridenour, Denver, CO (US); Craig Smith, Denver, CO (US); Andrew Tilley, Denver, CO (US)

(73) Assignee: HOMEADVISOR, INC., Denver, CO (US)

( * ) Notice: Subject to any disclaimer, the term of this patent is extended or adjusted under 35 U.S.C. 154(b) by 0 days.

(21) Appl. No.: 16/653,630

(22) Filed: Oct. 15, 2019

(65) Prior Publication Data

US 2020/0044982 A1 Feb. 6, 2020

Related U.S. Application Data

(63) Continuation of application No. 16/053,553, filed on Aug. 2, 2018, now Pat. No. 10,484,298, which is a
(Continued)

(51) Int. Cl.
*G06F 15/173* (2006.01)
*H04L 12/917* (2013.01)
(Continued)

(52) U.S. Cl.
CPC ...... *H04L 47/76* (2013.01); *G06Q 10/063112* (2013.01); *G06Q 30/016* (2013.01);
(Continued)

(58) Field of Classification Search
CPC ......... H04L 47/76; H04L 45/24; H04L 47/27; H04L 47/41; H04L 47/743; H04L 47/748;
(Continued)

(56) References Cited

U.S. PATENT DOCUMENTS 5,243,437 A 9/1993 Millman
5,842,178 A 11/1998 Giovannoli
(Continued)

OTHER PUBLICATIONS

T.M. Ho, T. LeAnh, S.M.A. Kazmi and C.S. Hong, "Opportunistic resource allocation via stochastic network optimization in cognitive radio networks," The 16th Asia-Pacific Network Operations and Management Symposium, Hsinchu, 2014, pp. 1-4. (Year: 2014).
(Continued)

*Primary Examiner* — Taylor A Elfervig
(74) *Attorney, Agent, or Firm* — Kilpatrick Townsend & Stockton LLP

(57) ABSTRACT

A method may include, by a network resource optimization system, receiving from a network node a resource request, determining a plurality of network resources based on the resource request, and determining a subset of network resources from the plurality of network resources and a network resource from the subset based on a score of each network resource. The score of each network resource may be based on a rate of acceptance of communication requests received or a number of communication sessions established. The method may include, by the network resource optimization system, transmitting a communication request to the determined network resource and receiving an acceptance from the network resource. The method may include, by the network resource optimization system, causing a selection mechanism to be activated at the network node, receiving from the network node a selection, and initiating the communication session in response to the selection.

20 Claims, 6 Drawing Sheets

Related U.S. Application Data continuation-in-part of application No. 14/942,829, filed on Nov. 16, 2015, now abandoned.

(51) Int. Cl.
| | |
|---|---|
| H04L 12/911 | (2013.01) |
| H04L 29/06 | (2006.01) |
| H04L 29/08 | (2006.01) |
| H04L 12/891 | (2013.01) |
| H04L 12/707 | (2013.01) |
| H04L 12/807 | (2013.01) |
| G06Q 10/06 | (2012.01) |
| G06Q 30/00 | (2012.01) |
| H04L 12/863 | (2013.01) |
| H04L 12/801 | (2013.01) |

(52) U.S. Cl.
CPC .............. H04L 45/24 (2013.01); H04L 47/27 (2013.01); H04L 47/41 (2013.01); H04L 47/743 (2013.01); H04L 47/748 (2013.01); H04L 47/822 (2013.01); H04L 67/125 (2013.01); H04L 67/141 (2013.01); H04L 67/18 (2013.01); H04L 67/22 (2013.01); H04L 67/32 (2013.01); H04L 69/24 (2013.01); H04L 47/34 (2013.01); H04L 47/50 (2013.01)

(58) Field of Classification Search
CPC ... H04L 47/822; H04L 67/125; H04L 67/141; H04L 67/18; H04L 67/22; H04L 67/32; H04L 69/24; H04L 47/34; H04L 47/50; G06Q 10/063112; G06Q 30/016
USPC ......................................................... 709/226
See application file for complete search history.

(56) References Cited

U.S. PATENT DOCUMENTS

| | | | | |
|---|---|---|---|---|
| 6,401,080 | B1* | 6/2002 | Bigus | G06Q 20/3821 |
| | | | | 705/35 |
| 7,096,193 | B1* | 8/2006 | Beaudoin | G06Q 10/06311 |
| | | | | 705/26.1 |
| 8,321,263 | B2* | 11/2012 | McCauley | G06Q 10/06 |
| | | | | 705/7.41 |
| 8,521,688 | B1 | 8/2013 | Belwadi et al. | |
| 8,612,262 | B1 | 12/2013 | Condon | |
| 8,660,872 | B1 | 2/2014 | Sedota et al. | |
| 8,825,736 | B2* | 9/2014 | Agrawal | G06Q 10/06312 |
| | | | | 709/203 |
| 9,129,326 | B2* | 9/2015 | Agrawal | G06F 16/951 |
| 9,978,107 | B2 | 5/2018 | White | |
| 10,152,695 | B1* | 12/2018 | Chiu | G06F 16/248 |
| 10,484,298 | B2 | 11/2019 | Laird et al. | |
| 10,810,642 | B1* | 10/2020 | Hawilo | G06Q 30/0619 |
| 2002/0194112 | A1* | 12/2002 | dePinto | G06Q 10/063112 |
| | | | | 705/37 |
| 2003/0018531 | A1 | 1/2003 | Mahaffy | |
| 2003/0126205 | A1 | 7/2003 | Lurie | |
| 2003/0182413 | A1* | 9/2003 | Allen | G06Q 30/06 |
| | | | | 709/223 |
| 2004/0015405 | A1 | 1/2004 | Cloutier | |
| 2004/0199412 | A1 | 10/2004 | McCauley | |
| 2005/0038688 | A1 | 2/2005 | Collins | |
| 2006/0136310 | A1 | 6/2006 | Gonen | |
| 2006/0184381 | A1* | 8/2006 | Rice | G06Q 30/0601 |
| | | | | 705/26.1 |
| 2006/0247999 | A1* | 11/2006 | Gonen | G06Q 30/0261 |
| | | | | 705/37 |
| 2007/0073610 | A1 | 3/2007 | Marugabandhu et al. | |
| 2007/0118435 | A1* | 5/2007 | Ran | G06Q 30/0641 |
| | | | | 705/7.36 |
| 2007/0192130 | A1 | 8/2007 | Sandhu | |
| 2008/0215493 | A1* | 9/2008 | Ong | G06Q 30/02 |
| | | | | 705/80 |
| 2009/0300161 | A1 | 12/2009 | Pruitt | |
| 2009/0319523 | A1 | 12/2009 | Anderson | |
| 2010/0174587 | A1* | 7/2010 | Seidman | G06Q 10/063 |
| | | | | 705/7.14 |
| 2010/0191552 | A1* | 7/2010 | Behrens | G06Q 10/02 |
| | | | | 705/5 |
| 2010/0211411 | A1* | 8/2010 | Hudson | G06Q 30/018 |
| | | | | 705/3 |
| 2011/0060737 | A1 | 3/2011 | Cardella | |
| 2012/0116912 | A1* | 5/2012 | Moran | G06Q 30/02 |
| | | | | 705/26.4 |
| 2013/0179270 | A1 | 7/2013 | Nolan | |
| 2014/0222453 | A1* | 8/2014 | Wills | G06Q 30/02 |
| | | | | 705/2 |
| 2014/0236935 | A1* | 8/2014 | Doebele | G06Q 50/01 |
| | | | | 707/723 |
| 2014/0279399 | A1* | 9/2014 | Shidler | G06Q 40/025 |
| | | | | 705/38 |
| 2015/0278903 | A1* | 10/2015 | Amjadi | G06Q 30/0625 |
| | | | | 705/26.62 |
| 2016/0086231 | A1* | 3/2016 | Darey | G06Q 30/0267 |
| | | | | 705/14.64 |
| 2017/0140323 | A1 | 5/2017 | Laird | |
| 2019/0068519 | A1 | 2/2019 | Laird et al. | |
| 2019/0206008 | A1* | 7/2019 | Dutta | G06N 7/005 |
| 2019/0273807 | A1* | 9/2019 | Mimran | H04L 67/18 |

OTHER PUBLICATIONS

N. Pang, Y. Shi and Y. You, "Resource Leveling Optimization of Network Schedule Based on Particle Swarm Optimization with Constriction Factor", 2008 International Conference on Advanced Computer Theory and Engineering, Phuket, 2008, pp. 652-656 (Year: 2008).

Weikai Liu, Zhi-Hong Guan and Ruiquan Liao, "Optimal Resource allocation on heterogeneous complex transport networks," 2010 Chinese Control and Decision Conference, Xuzhou, 2010, pp. 2985-2988. (Year: 2010).

Office Action dated Nov. 13, 2018 in related U.S. Appl. No. 16/053,553, 26 pgs.

Office Action dated Mar. 21, 2019 in related U.S. Appl. No. 16/053,553, 20 pgs.

Office Action dated Jan. 12, 2015 in U.S. Appl. No. 14/286,357, 12 pgs.

Office Action dated May 5, 2015 in U.S. Appl. No. 14/286,357, 12 pgs.

Office Action dated Oct. 21, 2015 in U.S. Appl. No. 14/286,357, 12 pgs.

Office Action dated Jun. 17, 2016 in U.S. Appl. No. 14/286,357, 15 pgs.

Office Action dated Sep. 22, 2017 in U.S. Appl. No. 14/286,357, 28 pgs.

Office Action dated Jun. 12, 2019 in U.S. Appl. No. 14/286,357, 25 pgs.

Office Action dated Mar. 22, 2019 in U.S. Appl. No. 14/286,357, 26 pgs.

ConsumerReports.org: The truth about Online rating services. Published Sep. 2013, accessed Sep. 13, 2015, available at http://www.consumerreports.org/cro/2013/09/online-ratings-servicesindex.htm.

Office Action dated Dec. 29, 2014 in U.S. Appl. No. 14/205,358, 7 pgs.

Office Action dated May 14, 2014 in U.S. Appl. No. 14/205,358, 13 pgs.

Office Action dated Feb. 22, 2016 in U.S. Appl. No. 14/205,358, 15 pgs.

Office Action dated Sep. 23, 2016 in U.S. Appl. No. 14/205,358, 16 pgs.

Office Action dated Nov. 2, 2017 in U.S. Appl. No. 14/205,358, 18 pgs.

(56) References Cited

OTHER PUBLICATIONS

Office Action dated Sep. 14, 2019 in U.S. Appl. No. 14/205,358, 23 pgs.

"Handy hopes to simplify booking for household services in Boston & NYC". Available at http://xconomy.com/boston/2012/09/12/handybook-hopes-to-simplify-booking-for-household-services-in-boston-nyc/. Published Sep. 12, 2012.

Online Home Services Company Launches in Detroit; ServiceMagic.com Helps Consumers Take the Guesswork Out of Hiring Home Service Professionals PR Newswire (New York) Nov. 1, 2000; 1.2 pgs.

\* cited by examiner

OPTIMIZATION OF NETWORK RESOURCES

CROSS-REFERENCE TO RELATED APPLICATIONS

This application is a continuation of U.S. patent application Ser. No. 16/053,553, filed Aug. 2, 2018, which is a continuation-in-part of U.S. patent application Ser. No. 14/942,829, filed Nov. 16, 2015, the disclosures of which are incorporated by reference herein in their entirety, for all purposes, as if fully set forth herein.

BRIEF SUMMARY OF THE INVENTION

In one embodiment, a method for initiating communication between a network node and a network resource is provided. The method may include receiving, by a network resource optimization system from a network node, a resource request. The resource request may include required resource parameters. The method may further include determining, by the network resource optimization system, a plurality of network resources that may satisfy the required resource parameters. The method may also include determining, by the network resource optimization system, a subset of network resources from the plurality of network resources based, at least in part, on a first score of each of the plurality of the network resources. The first score of each network resource may be based, at least in part, on a rate of acceptance of communication requests received by the network resource. The first score of each network resource may also or alternatively be based, at least in part, on a number of times communication sessions were established between the network resource and any network node in consequence to accepted communication requests. The method may also include selecting, by the network resource optimization system, a first network resource from the subset of network resources based, at least in part, on the first score. The method may further include transmitting, by the network resource optimization system to the first network resource, a first communication request. The method may also include receiving, by the network resource optimization system from the first network resource, an acceptance of the first communication request. Receiving the acceptance may cause the network resource optimization system to activate a first selection mechanism at the network node. The method may also include receiving, by the network resource optimization system from the network node, a first selection made through the first selection mechanism. Receiving the first selection may cause the network resource optimization system to initiate the communication session between the first network resource and the network node.

In another embodiment, a system for initiating communication between a network node and a network resource is provided. The system may include one or more processors and a non-transitory machine readable medium. The non-transitory machine readable medium may have instructions stored thereon. The instructions may be executable by one or more processors to perform a method. The method may include receiving, by a network resource optimization system from a network node, a resource request. The method may also include parsing, by the network resource optimization system, the resource request to determine required resource parameters. The method may also include determining, by the network resource optimization system, a plurality of network resources that satisfy the required resource parameters. The method may further include determining, by the network resource optimization system, a subset of network resources from the plurality of network resources based, at least in part, on a score of each of the plurality of the network resources. The score of each network resource may be based, at least in part, on a rate of acceptance of communication requests received by the network resource. The score of each network resource may be based, at least in part, on a number of times communication sessions were established between the network resource and any network node in consequence to accepted communication requests. The method may further include transmitting, by the network resource optimization system to each of at least two network resources of the subset of network resources, a communication request based, at least in part, on the score of each of the at least two network resources of the subset of network resources.

In another embodiment, a non-transitory machine readable medium is provided. The non-transitory machine readable medium may have instructions stored thereon for initiating communication between a network node and a network resource. The instructions may be executable by one or more processors to perform a method. The method may include receiving, by a network resource optimization system from a network node, a resource request. The method may also include parsing, by the network resource optimization system, the resource request to determine required resource parameters. The method may further include determining, by the network resource optimization system, a plurality of network resources that satisfy the required resource parameters. The method may also include determining, by the network resource optimization system, a subset of network resources from the plurality of network resources based, at least in part, on a score of each of the plurality of the network resources. The score of each network resource may be based, at least in part, on a rate of acceptance of communication requests received by the network resource. The score of each network resource may be based, at least in part, on a global rate of acceptance of communication requests received by the plurality of network resources. The method may also include selecting, by the network resource optimization system, a candidate network resource from the subset of network resources based, at least in part, on the score. The method may also include transmitting, by the network resource optimization system to the candidate network resource, a communication request. The method may further include receiving, by the network resource optimization system from the candidate network resource, an acceptance of the communication request. Receiving the acceptance may cause the network resource optimization system to activate a selection mechanism at the network node. The method may further include receiving, by the network resource optimization system from the network node, a selection made through the selection mechanism. Receiving the selection may cause the network resources optimization system to initiate a communication session between the candidate network resource and the network node.

BRIEF DESCRIPTION OF THE DRAWINGS

Embodiments of the present invention are described in conjunction with the appended figures.

Figure 1:
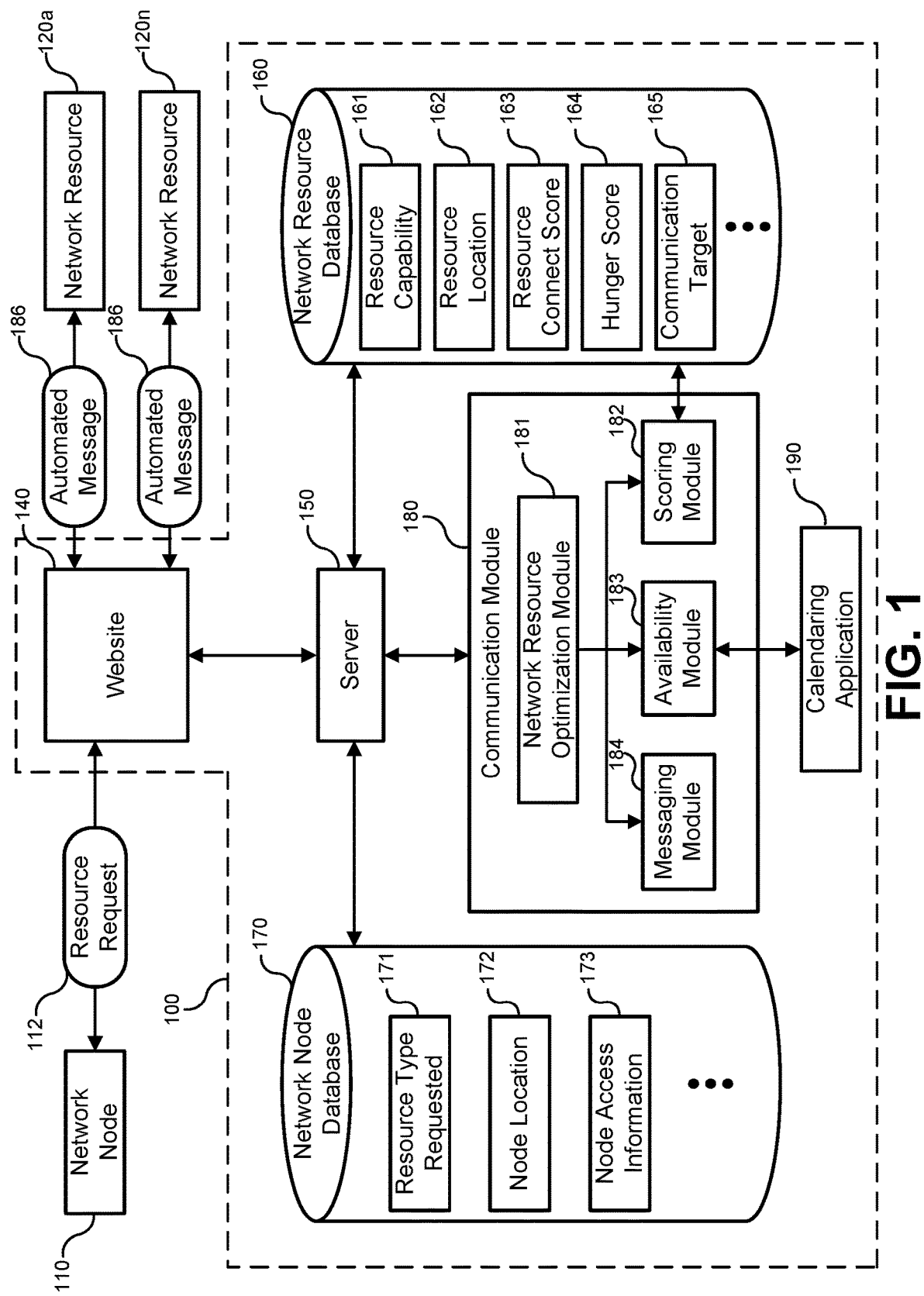
FIG. 1 illustrates a block diagram of a network resource optimization system for initiating communication sessions between network nodes and network resources according some embodiments of the present disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to any embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory mediums, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein are systems and methods for initiating communication sessions between network nodes and network resources. The systems and methods may identify network resources that network nodes may utilize. More specifically, the systems and methods described may enable a network node to electronically request information about one or more network resources and/or provide required resource parameters for identifying one or more network resources. For example, the network node may send a resource request to a network resource optimization system. The request may include the required resource parameters, which may include parameters or characteristics related to the resources requested, such as type of resources, abilities, and/or components of the resources requested, limitations or constraints placed by the network node 110, such as expected value of the resource requested and timeframe for transmission and/or delivery of the resource requested, and so forth. The resource request may be provided to the network resource optimization system, merely by way of example, via a website or other interface on a wide area or local area network, or an application over another type of network such as a cellular data network, etc.

The network resource optimization system may process the resource request and determine or identify one or more network resources that satisfy the required resource parameters. The identified network resources may then be evaluated or ranked to determine a subset of network resources using a score and/or a number of other factors. Some of these factors may include, but is not limited to, past response times, acceptance of communication requests (e.g., the number of times previous communication requests were accepted and whether communication sessions were established between the network resource and network nodes), availability, quality of the resource, performance evaluations provided by other network nodes and so on.

Once the subset of the network resources is identified and ranked, the network resource optimization system may automatically generate an automated message and may provide it to the highest ranked network resource. As used herein, the phrase "automated message" may include, but is not limited to, a voice communication (e.g., a phone call), a video communication, a Short Message Service (SMS) message, a Multimedia Messaging Service (MMS) message, a text message, an audio message, an email, and/or other such electronic communications.

The automated message may include the required resource parameters from the network node as well as other information provided by the network node. For example, the automated message may include information regarding the location of the network node or the location of the resource requested, the type of resource or components of the resource requested, expected value of the resource requested, time constraints on transmission or delivery of the request resource, and so on.

Once the automated message is received, the highest ranked network resource may choose whether to be connected with the network node. If the network resource elects to communicate with the network node, the network resource optimization system may facilitate the communication session by initiating a communication session between the network node and the network resource. In some embodiments, the network resource and the network node may be able to directly communication with each other using the communication session facilitated by the network resource optimization system. This may include a network resource choosing to directly communicate with the network node upon the network resource receiving the automated message, the network node accepting or otherwise joining the initiated communication session, and/or the network node acknowledging or otherwise accepting an automated message to directly communicate with the network resource.

In some embodiments, the communication session may be established using a voice communication (e.g., a telephone call), a video communication, an email, a MMS message, a SMS message, a text message, an instant message, and/or other form of electronic communication.

However, if the highest ranked network resource declines to be connected with the network node, the network resource optimization system may send the automated message to the next highest ranked network resource identified. This process may repeat until there may be no network resources left in the subset of network resources or until a network resource is connected with the network node.

In some embodiments, the network node may accept or reject the communication session with the selected network resource. In some embodiments, the network node may view information about the selected network resource prior to accepting or joining the communication session. In some embodiments, an automated message may be provided to the network node prior to the network resource optimization system initiating the communication session.

FIG. 1 shows an exemplary network resource optimization system 100 that may initiate one or more communication sessions between network nodes 110 and network resources 120 according to one or more embodiments of the present disclosure. For example and as shown in FIG. 1, a network node 110 may access the network resource optimization system 100 via a front-end application, such as a website 140 or other user interface application. Although only one network node 110 is shown in FIG. 1, the network resource optimization system 100 may be accessed by any number of network nodes 110 simultaneously or at different times. The network node 110 may be or may include a client device, which may include any computing device, such as a smart phone, a smart watch, a PDA, a laptop computer, a desktop computer, a tablet computer, a voice-activated digital assistant, an augmented reality device, a virtual reality device and/or any other computing device that can receive inputs from the user and provide outputs. As used herein, the term "website" may include a traditional website or web form accessible through a web browser on a computer. This term may also encompass network-based access to a web server through an application running on a mobile phone, tablet computer, smart phone, smart watch and the like.

The network resource optimization system 100 may receive from the network node 110, via the website 140, resource requests 112 and/or other information about one or more resources. The website 140 may be hosted by or be otherwise accessible by a server 150. The network resource optimization system 100 may receive information from the network node 110 via an online resource request form provided on the website 140. For example, the network resource optimization system 100 may receive selections or inputs from the network node 110 of required and/or preferred resource parameters about the resource requested by taking inputs provided by the network node 110 using the resource request form. The resource parameters may include the type of resource requested, a timeframe for using the resource of for when it is needed, an expected value or cost range for the use of the resource, locations for the resource (e.g., geographic locations for the resource), and other required and/or preferred attributes of the resource requested. Although a resource request form is specifically mentioned, such a form may be not required. That is, the network node 110 may access the website 140, an application or other electronic medium to provide information about the resource requested.

The network node 110 may also be prompted to provide or otherwise submit information about the network node 110 to the network resource optimization system 100. This information may include a location of the network node 110 (e.g., geographic location of the network node 110), contact or access information for the network node 110 and so on. The information provided by the network node 110 may be stored in a network node database 170.

The network node database 170 may be hosted by or be otherwise accessible by the server 150. As shown in FIG. 1, the network node database 170 may include information discussed above. For example, the network node database 170 may include the type of resources 171 requested or inquired about by the network node 110, location information 172 of the network node 110, access information 173 of the network node 110, and so on. Although specific information is discussed, additional or less information about the network node 110 may be stored by the network node database 170.

One or more network resources 120 may also access the website 140 and provide resource information. The resource information may be stored in a network resource database 160, which may be hosted by or be otherwise accessible by the server 150 of the network resource optimization system 100. For example, network resource 120a and network resource 120n may access the website 140 hosted by the server 150 and provide information about the respective capabilities 161 associated with the network resources 120 (e.g., types of resources provided by or otherwise available from the network resources 120), location information 162 associated with the network resources 120 (e.g., geographic locations of the network resources 120), and other characteristics or attributes associated with the network resources 120.

Although two network resources 120 are shown and discussed, the network resource optimization system 100 may allow any number of network resources 120 to access the website 140. In some embodiments, the network resource 120 may be or may include a client device, which may include any computing device, such as a smart phone, a smart watch, a PDA, a laptop computer, a desktop computer, a tablet computer, a voice-activated digital assistant, an augmented reality device, a virtual reality device and/or any other computing device that can receive inputs from the user and provide outputs.

As will be discussed in greater detail below, the network resource database 160 may also store a connect score 163 about or otherwise associated with each network resource 120. The connect score 163 may be determined by the network resource optimization system 100 by tracking a rate of acceptance of communication requests by the network resources 120 as well as the number of times communication sessions were established between each network resource 120 and one or more network nodes 110. Thus, the more communication requests that have been accepted by a network resource 120, the higher the connect score 163 for that network resource 120 may be.

More specifically, the network resource optimization system 100 may be configured with a communication module 180. Once the network resource optimization system 100 receives from the network node 110 a resource request 112 including required resource parameters, the communication module 180 may be configured to initiate a communication session between a network resource 120 and the network node 110. As will be described in more detail below, the communication module 180 may be configured with various modules and components configured to select a network resource 120 that may satisfy the resource parameters and may be more likely to accept or have a greater probability of accepting a communication request to be connected with the requesting network node 110 upon receipt of the communication request.

More specifically, the communication module 180 may include a network resource optimization module 181. The network resource optimization module 181 may be configured to receive information, such as resource requests 112, provided by network nodes 110 and find appropriate resources requested by the network nodes 110. As discussed above, the resource request 112 may include required resource parameters, such as the type of resource requested or components of the resource requested, location of resource to be provided, expected or estimated value of the resource requested, timeframe constraints, and so on.

The network resource optimization module 181 may parse the information included in the resource request 112 and store the information in a database, such as the network node database 170. The network resource optimization module 181 may then compare the information received from the network node 110 with information associated with various network resources 120 to determine one or more network resources 120 that may satisfy the required resource parameters.

More specifically, the network resource optimization module 181 may compare the required resource parameters with the information associated with various network resource 120 stored in the network resource database 160. For example, the network resource optimization module 181 may compare and/or match the type of resources 171 requested by the network node 110, as well as the location information 172 provided by the network node 110, with the network resource capabilities 161 and the location information 162 stored in the resource database 16. After determining the network resources 120 that may satisfy the required resource parameters, the network resource optimization module 181 may further identify a subset of network resources 120 for initiating a communication session with the network node 110.

The subset of network resources 120 may be identified at least in part based on the connect score 163 associated with each network resource 120. Specifically, the communication module 180 may be configured with a scoring module 182 that may be in communication with the network resource optimization module 181. The scoring module 182 may be configured to calculate the connect score 163 associated with each network resource 120. The network resource optimization module 181 may consider the connect scores 163 associated with the network resources 120 when generating the subset of network resources 120.

More specifically, the scoring module 182 may be configured with a scoring algorithm or scoring logic to track whether a network resource 120 accepts or denies a communication request to be connected with a network node 110 and to dynamically update the connect score 163 associated with each network resource 120 based on the tracked information. As the connect score 163 may be dynamically updated, the network resource optimization module 181 may consider the updated connect score 163 when generating the subset of network resources 120.

As described above, in some embodiments, the connect score 163 may be determined based at least in part on the number of times a particular network resource 120 has accepted a communication request or has otherwise been connected with a network node 110. Thus, the more times a particular network resource 120 may be connected with a network node 110, the higher the connect score 163 may be. In some embodiments, the connect score 163 may be further determined based at least in part on a rate of acceptance of one or more communication requests (e.g., the number of times the particular network resource 120 has been identified by the network resource optimization module 181 for a communication session with a network node 110 versus the number of times the particular network resource 120 has accepted a communication request or has otherwise been connected with the network node 110). Thus, the connect score 163 may be indicative of a probability of whether the network resource 120 may answer and/or accept an incoming communication request.

In some embodiments, the connect score 163 may be a weighted average of: 1) the acceptance rate of one or more requested communication sessions associated with a particular network resource 120, and 2) a global acceptance rate. The global acceptance rate may be all, or a particular subset of, acceptance of requested communication sessions provided to all network resources 120, or a subset of network resources 120 over a particular period (e.g., 14 days, 1 month, 1 year etc.). The subset of network resources 120 may include network resources 120 associated with a particular location 162, having a particular capability 162 and so on.

In some embodiments, the weighting may be based, at least in part, on the amount of history of the network resource 120, such as the number of communication requests the network resource 120 has had to be connected with a network node 110. For example, if the network resource 120 has a long history, the weighted average may be close to its rate of acceptance. On the other hand, if the network resource 120 does not have a long history, the weighted average may be closer to the global rate of acceptance.

In some embodiments, the probability of whether a network resource 120 may answer an incoming communication request may be further determined based on a hunger score 164 that may be associated with the particular network resource 120. As will be discussed in more detail below, the hunger score 164 may be related to or indicative of the level of readiness and/or willingness the network resource 120 may respond to a communication request. In some embodiments, the hunger score 164 may be a combination of parameters that relate to the availability of the network resource 120 to accept a communication request. In some embodiments, the hunger score 164 may be related or equivalent to a communication target 165 set by the network resource 120. The hunger score 164, as well the communication target 165, may be stored in the network resource database 160.

The communication target 165 may be indicative of a target number of communication requests that the network resource 120 may expect or may be willing to receive and/or to respond to over a given time period. Over the course of this time period, the communication target 165 associated with the network resource 120 may decrease as the network resource 120 responds to communication requests. As such, the communication target 165, as well as the hunger score 164, may be at least partially inversely related to the number of communication requests the network resource 120 may answer and/or accept. For example, a network resource 120 may set an initial communication target 165 of 100. If the network resource 120 has responded to 95 communication requests, the network resource 120 may have a hunger score 164 of 5, although the hunger score may have been greater when the network resource 120 had responded to only 50 communication requests versus 95 in this example. Thus, the hunger score 164 for a particular network resource 120 may change or fluctuate over the particular time period. However, if the second network resource 120 has set an initial communication target 165 of 50 but has not responded to any communication requests or has not been given the opportunity to do so, the second network resource 120 may have a greater hunger score 164 even though the initial communication target 165 may be only 50 versus 100 in the example above. Although a communication target 165 is specifically mentioned, other factors may be used to determine the hunger score 164 for a particular network resource 120.

In some embodiments, the connect score 163 may be determined based on the hunger score 164. Accordingly, although not required, the connect scores 163 of the network resources 120 may fluctuate over a given time period based on their hunger scores 164. In some embodiments, the connect score 163 may not vary based on the hunger score 164. However, as discussed above, the hunger score 164 may have an effect on the probability that the network node 110 may respond to a communication request.

In some embodiments, the connect score 163 may be combined (e.g., added, multiplied and so on) with a random number. The random number may be generated based on the number of communication requests received by the network resource 120 and/or the number of times communication sessions were established between the network resource 120 and network nodes 110. In some embodiments, the random number may have a normal distribution with a mean of 0. In some embodiments, the volatility of the random number for each network resource 120 may be inversely or at least partially inversely related to the number of communication requests and/or times of communication sessions established between the network resource 120 and network nodes 110. The random number may be more volatile if the network resource 120 has less history with respect to communication requests received to be connected with network nodes 110, and the random number may be less volatile when the network resource 120 has more history with respect to communication requests received to be connected with network nodes 110. Although a random number is described above, other factors may be added or otherwise combined with the connect score 163. These factors may include time of day of the communication session, month of the year, day of the week and so on.

Combining the connect score 163 with the random number described above may maximize the calculated probability of a network resource 120 accepting an incoming communication request. For example, this combination may allow network resources 120 with little or no history to build up a history by artificially inflating or otherwise distorting their connect score 163. In other words, the inflated or otherwise distorted probability of a particular network resource 120 accepting an incoming communication request may fall somewhere in a distribution centered around their estimated probability (as discussed above) with a variance that may be inversely or at least partially inversely proportional to their volume of history. As such, a network resource 120 without significant history may receive a communication request in place of network resources 120 which may have significant history even if the network resource 120 without significant history may have a lower estimated acceptance probability.

Once the connect score 163 and/or the probability of whether a network resource 120 may accept a communication request may be calculated as discussed above, the network resource 120 that may be associated with a connect score 163 and/or probability over a particular threshold may be determined or otherwise selected to be included in the subset of the network resource 120 for possibly initiating a communication session with the network node 110.

As discussed above, the connect score 163 may be automatically tracked and updated by the scoring module 182. For example, the scoring module 182 may track whether the various network resources 120 accepted the communication request. This information may be used to update the connect scores 163 of the various network resources 120. For network resources 120 that may not have a connect score 163 or for network resources 120 that may have a connect score 163 below a threshold, the network resource optimization module 181 may randomly select one or more of these network resources 120 from the network resource database 160 and include them in the identified subset of network resources 120 (presuming they satisfy other required resource parameters, such as type of resources required). Thus, network resources 120 that may be newer to the network resource optimization system 100 and thus may not have a significant history may have the opportunity to be connected with a network node 110.

In some embodiments, the network resource optimization module 181 may place these network resources 120 in random position (e.g., ranking) in the subset of network resources 120 regardless of their connect score 163. That is, a network resource 120 that may be new to the network resource optimization system 100 or that may have a low connect score 163 may be placed in the subset hierarchy (e.g., the order of network resources 120 based on their connect scores 163) above a network resource 120 with a higher connect score 163. Thus, the new network resource 120 may be given opportunities to build and/or raise its associated connect score 163.

In some embodiments, the network resource optimization module 181 may track the number of times the new network resource 120 may be given opportunities to be connected with a requesting network node 110. The more the new network resource 120 has accepted communication requests, the more opportunities the new network resource 120 may be given (at least until its associated connect score 163 may exceed a minimum connect score 163 threshold). However, if the new network resource 120 has not increased its associated connect score 163 above the connect score threshold after being provided with a given number of communication requests, the communication module 180 may cease to place, or decrease placement of, that particular network resource 120 in the subset of the network resources 120. As such, the new network resource 120 may be given fewer opportunities to raise its connect score 163.

Likewise, the network resource optimization module 181 may track the number of times a particular network resource 120 has been pushed down in the ranking due to a newer network resource 120 being given the opportunities discussed above. That way, one network resource 120 with a high connect score 163 may not be continually denied the opportunity to accept or deny communication requests by constantly being displaced by new network resources 120. For example, if a network resource 120 with a high connect score 163 has been moved down the subset hierarchy due to a new network resource 120 being placed ahead of it, that particular network resource 120 may not be displaced by another new network resource 120 for a period of time.

In some embodiments, the communication module 180 also may include an availability module 183. The network resource optimization module 181 may communicate with the availability module 183 in order to determine which network resources 120 may be included in the subset of network resources 120. For example, the availability module 183 may have access to one or more calendaring applications 190 associated with or used by the various network resources 120. Thus, the network resource optimization module 181 and/or the availability module 183 may be able to determine the availability of each network resource 120 from calendaring application 190 when determining whether to include a network resource 120 in the subset of network resources 120.

In some embodiments, the network resource optimization module 181 may rank or otherwise scale the connect score 163 of the network resource 120 in the subset based on its determined availability. Thus, if a network resource 120 is not available, its connect score 163 may be scaled accordingly. In some embodiments, the scaling of the connect score 163 of a network resource 120 may cause that particular network resource 120 not to be included in the subset. Further, because the network resource 120 was unavailable, the connect score 163 of the network resource 120 may not be as adversely affected as if that network resource 120 would have not accepted a communication request when the network resource 120 was available and the opportunity to accept a request had been provided.

Put another way, if a network resource 120 satisfies some of the required resource parameters, such as the location and capability criteria of the resource request 112 from the network node 110, but has no availability during the requested timeframe, the network resource optimization module 181 may not include that network resource 120 in the subset. Thus, although the network resource 120 potentially may miss out on an opportunity to be connected with a network node 110 due to unavailability, the connect score 163 associated with the network resource 120 may remain unchanged.

In some embodiments, the availability module 183 may also be configured to update the calendaring application 190 of the network resource 120 and/or the network node 110. Thus, when a network resource 120 accepts the resource request 112, the availability module 183 may update the calendaring application 190 of the network resource 120 to show the details of the resource requested. For example, the availability module 183 may update the calendaring application 190 to include some or all of the required resource parameters.

Once the subset of network resources 120 is identified, the network resources 120 may be then ranked based, at least in part, on their respective associated connect scores 163. The network resource 120 with the highest connect score 163 may be ranked first, the network resource 120 with the second highest connect score 163 may be ranked second, and so forth.

When the network resources 120 in the subset have been ranked according to their connect score 163, the communication module 180 may automatically generate an automated message to be transmitted to the subset of the network resources 120. More specifically, the communication module 180 may be configured with a messaging module 184. As with the availability module 183, the messaging module 184 may be in communication with the network resource optimization module 181. The messaging module 184 may be configured to generate automated messages 186 that may be provided to the subset of network resources 120. For example, the messaging module 184 may receive information, such as required resource parameters included in the resource request 112 from the network node 110 and use that information when the automated message 186 is generated. Thus, the automated message 186 may include information or the required resource parameters about the requested resource, such as the type of the resource or components of the resource requested, the desired value, any time constraints on transmission or delivery of the requested resource, and so on. The automated message 186 may also include a communication request for initiating a communication session with the requesting network node 110.

Once the automated message 186 has been automatically generated by the messaging module 184, the automated message 186 may be transmitted, via the network resource optimization module 181, to a network resource 120. The automated message 186 may be transmitted by the messaging module 184 and/or the network resource optimization module 181 to the network resource 120 over a network, such as a local area network, a wide-area network, the Internet, a telephonic network, a cellular network, and so on. The automated message 186 may be in the form of a voice communication (e.g., a phone call), a video communication, a Short Message Service message, a Multimedia Messaging Service message, a text message, an audio message, an email, or other electronic communication such as a customized type of message shared by a customized application.

In some embodiments, once the automated message 186 has been generated, the network resource optimization module 181 may send the automated message 186 to the network resource 120 with the highest connect score 163. In some embodiments, the network resource optimization module 181 may send out the automated message 186 to multiple network resources 120 simultaneously or substantially simultaneously. In such instances, the network resource 120 that accepts a communication request first may be connected to the network node 110 via the network resource optimization system 100.

When network resource optimization module 181 transmits the automated message 186 to the network resource 120, the transmission of the automated message 186 may activate or cause the network resource 120 to output and/or present the automated message 186 to a user, including outputting and/or presenting the required resource parameters and the communication request. The network resource 120 may also receive an input from the user. The network resource 120 may be configured with a selection mechanism. The selection mechanism may be configured to receive inputs from the user. The selection mechanism may enable the user to make a selection or response to the communication request after being presented with the required resource parameters. The selection or input from the user may include an acceptance to the communication request to be connected with the requesting network node 110. Alternatively, the input may include a rejection of the communication request to be connected with the network node 110.

In a more specific example, once the network resource 120 associated with the highest connect score 163 has been identified, the messaging module 184 may generate an automated message 186, which may include one or more of the required resource parameters and a communication request. The network resource 120 may be or may include a telephone communication device associated with the network resource 120. The automated message 186 may include a voice message and may be transmitted or provided to the network resource 120 via, e.g., a telephone call initiated by the communication module 180. When the network resource 120 answers the call and receive the automated message 186, the network resource 120 may output or present the automated message 186 to a user. The network resource 120 may then receive an input or selection from the user indicating a response to the communication request included in the automated message 186. For example, the user may dial a button (e.g., "1") on the network resource 120 to indicate an acceptance to the communication request, or the user may dial another button (e.g., "2") to decline the communication request. Although specific example of the network resource 120 and inputs are described above, the network resource 120 may include any types of communication devices and the user may be able to accept or decline the communication request using any number of input or selection mechanisms the network resource 120 may be configured with.

If the network resource 120 receives an input or selection from the user indicating an acceptance of the communication request (e.g., in the above example button "1" may be dialed), the network resource 120 and/or the user may be placed on hold, and the communication module 180 may contact the network node 110 for initiate a communication session between the network node 110 and the network resource 120. For example, the network node 110 may be or may include a telephone communication device associated with the network node 110 such that the communication module 180 may initiate a telephone call with the network node 110. When the call is answered, the communication module 180 may connect the network node 110 and the network resource 120 by joining the two calls. In some embodiments, the communication module 180 may relay information to the network node 110 that a communication session may be initiated with a network resource 120, prior to the communication session being established between the network node 110 and the network node 110.

In some embodiments, the messaging module 184 may generate another or a second automated message and send it to the requesting network node 110 prior to initiating the communication session. For example, the communication module 180 may initiate a telephone call to the network node 110. When the call is answered, the communication module 180 may transmit the second automated message to the network node 110. The second automated message may include information about the network resource 120, such as resource capabilities associated with the network resource 120, resource quality associated with the network resource 120, resource or and/or performance evaluations associated with the network resource 120 that were provided by other network nodes 110, and so on.

The network node 110 may output or present the second automated message to a user. The network node 110 may also output or present the user with the option and/or selection to join or decline to join the communication session. The network node 110 may be configured with any suitable selection mechanism that may enable the user to make a selection and/or provide an input to the network node 110 indicating the user's selection. If the network node 110 receives an input or selection from the user indicating that communication may be initiated, the communication module 180 may initiate a communication session between the network node 110 and the network resource 120. For example, the communication module 180 may initiate the communication session between the network resource 120 and the network node 110 by joining the two telephone calls. Although a telephone call is specifically mentioned, other forms of communication may be contemplated.

If the network resource 120 associated with the highest connect score 163 declines the communication request or does not answer or otherwise acknowledge the automated message 186, the communication module 180 may provide the automated message 186 to the network resource 120 with the next highest connect score 163 and the process described above may repeat. The network resource 120 with the next highest connect score 163 may receive the automated message 186 and may accept or deny the communication request.

This process may continue until the communication request is accepted or there are no more network resources 120 in the subset of network resources 120. If the latter occurs, a second subset of network resources 120 may be identified by the network resource optimization system 100 and the process described above may repeat. In some embodiments, the network resource optimization system 100 may identify and present additional network resources 120 to the requesting network node 110 using a different medium. For example, the network resource optimization system 100 may provide information about additional network resources 120 to the network node 110 using the web site 140 on which the original inquiry may be made.

In some embodiments, the communication module 180 may identify two or more network resources 120 with high connect scores 163 or connect scores 163 that may be above a threshold. Once these network resources 120 are identified, the communication module 180 may generate and send an automated message 186 to each network resource 120 simultaneously or substantially simultaneously. The first network resource 120 to accept the communication request may then be connected with the network node 110.

In some embodiments, the communication module 180 may generate and transmit the automated message 186 to each network resource 120 of the identified subset and allow each of the network resources 120 to accept or reject the communication request. If multiple network resources 120 responded, for example, multiple network resources 120 may respond within a threshold amount of time, the communication module 180 may generate and transmit another automated message to the network node 110, which may include information about each network resource 120. When the automated message is received or otherwise acknowledged by the network node 110, the network node 110 may be connected with one of the network resources 120.

In some embodiments, the network node 110 may be connected with each of the identified network resources 120. The communication module 180 may initiate a communication session between the network node 110 and each network resource 120 in a determined sequence. The sequence may be determined based on the response time of each network resource 120. In some embodiments, the network node 110 may be instantly connected with the additional network resources 120 after a communication session with one of the network resources 120 has ended.

Figure 2:
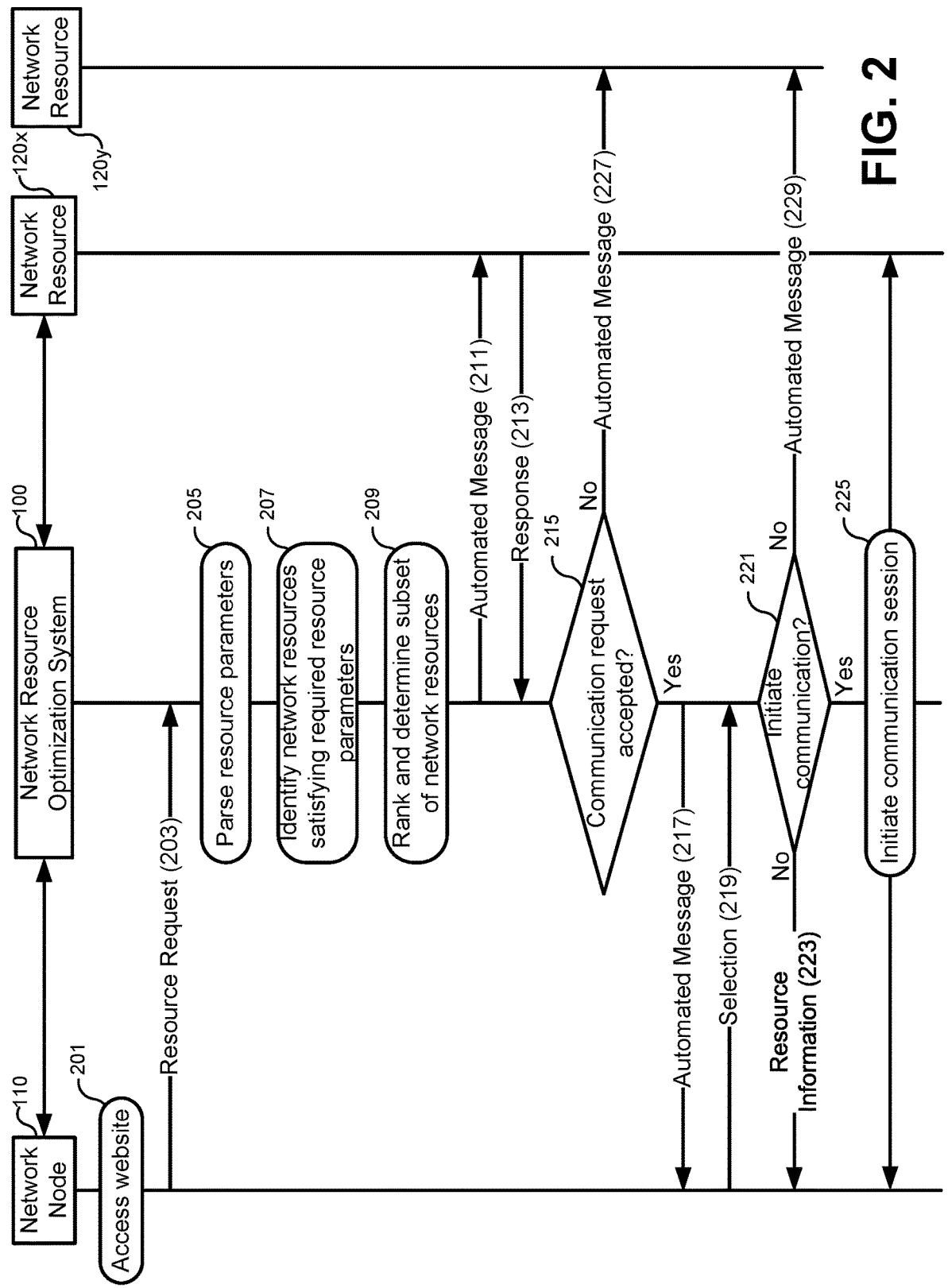
FIG. 2 illustrates a block diagram summarizing the process for initiating communication sessions between network nodes and network resources according to some embodiments of the present disclosure.

FIG. 2 illustrates a block diagram summarizing the process for initiating communication sessions between network nodes 110 and network resources 120 according to one or more embodiments of the present disclosure. The network node 110 may access the website 140 to access and utilize the network resource optimization system 100 (201). The network node 110 may enter a resource request 112 on the website 140 by providing the website 140 with preferred and/or required resource parameters of the resource requested. For example, the network node 110 may access an electronic form, text box, radio button, or other selection mechanisms provided on the website 140 and provide information about a desired resource. In some embodiments, the network node 110 may speak, type, input or otherwise use an application executing on a mobile computing device, or other such computing device, to provide the information about the resource requested.

The network node 110 may also provide information about the network node 110 and/or the user associated with the network node 110. The information may include location (e.g., geographic location) of the network node 110 and/or the associated user, contact or access information of the network node 110 and/or the associated user, and the like. In some embodiments, the access information and/or the location may be determined automatically using, for example, an IP address associated with the network node 110, one or more GPS sensors included in the network node 110, and so on.

The resource request 112, as well as the information about the network node 110 and/or the associated user, may then be transmitted to the network resource optimization system 100 (203). Upon receiving the resource request 112 from the network node 110, the network resource optimization system 100 may parse and identify preferred and/or required resource parameters from the resource request 112 and/or the information about the network node 110 (205). The resource parameters parsed and identified may be used to determine one or more potential or candidate network resources 120 for initiating a communication session with the network node 110.

For example, the information provided by the network node 110 may be parsed by the network resource optimization module 181 to obtain location information of the network node 110, type of resource requested, preferred and/or required components of the resource requested, expected or desired timeframe for transmission and/or delivery of the resource requested, expected or desired value of the resource requested, and other preferred and/or required resource parameters.

Once the preferred and/or required resource parameters are obtained, the network resource optimization system 100 may determine one or more network resources 120 that may satisfy the preferred and/or required resource parameters (207). The network resources 120 may be identified based, at least in part, on information that the network resources 120 have provided to the system, which may be stored in the network resource database 160. For example, network resources 120 that may have capabilities 161 matching, for example, the type of resources requested by the network node 110, and that may be associated with one or more locations 162 matching the location 172 of the network node 110 may be identified.

The identified network resources 120 may be then ranked using a score, such as the connect score 163 determined using the scoring logic of the scoring module 182 as discussed above, to determine a subset of the network resources 120 (209). For example and as discussed above, in determining the connect score 163, the historical acceptance of resource requests 112 by each network resource 120 may be taken into account. That is, the subset of network resources 120 may be determined and/or ranked based, at least in part, on the number of times the network resources 120 were provided with a communication request, accepted the communication request, accepted or otherwise acknowledged an automated message 186, and/or instantly connected with the request network node 110. In some embodiments, the various factors may be weighted.

In some embodiments, the connect score 163 of each network resource 120 may be weighted on other factors. For example, the connect score 163 of a network resource 120 may be weighted based on the availability of the network resource 120. Thus, if the network resource 120 is not available during the timeframe requested by the network node 110, the network resource 120 may still be given the option to connect with the network node 110 (although the network resource 120 may be placed lower on the ranking or connect hierarchy). However, as described above, although the ranking of the network resource 120 may be lowered, the connect score 163 of the network resource 120 would not be affected due to its limited or no availability to accept the communication request.

Other factors, such as the historical global acceptance rate of all network resources 120 (or a subset thereof) and/or the hunger scores 164, may be combined with the connect score 163 to determine the probability of whether a particular network resource 120 may accept a communication request. The connect score 163 may further be inflated or adjusted using other algorithm, such as added or multiplied by a random number, in order to allow new network resources 120 or network resources 120 with no or limited history to be included in the subset, as discussed above.

Once the subset of network resources 120 is determined, as discussed above, the communication module 180 of the network resource optimization system 100 may generate an automated message 186 and provide that automated message 186 to the highest ranked network resource $120x$ (211). The automated message 186 may include the required resource parameters, the communication request to be connected with the network node 110, and/or information about the network node 110. Once the automated message 186 is received, the highest ranked network resource $120x$ may accept or reject the communication request to be connected with the network node 110 using any of the selection mechanisms discussed above. The response or selection of the highest ranked network resource 120x may then be transmitted to the network resource optimization system 100 (213).

If the network resource optimization system 100 receives an acceptance to the communication request from the highest ranked network resource 120x or otherwise determine that the highest ranked network resource 120x accepted the communication request (215), the network resource optimization system 100 may initiate a communication session between the network resource 120x and the network node 110 (225). In some embodiments, the network resource optimization system 100 may generate and provide another or a second automated message to the network node 110 (217) prior to initiating the communication session. The second automated message may relay information to the network node 110 that a communication session may be initiated with the network resource 120x. The second automated message may also include information about the network resource 120x with which the communication session may be established.

In some embodiments, receiving the acceptance from the highest ranked network resource 120 (213) and/or sending the second automated message to the network node 110 (217) may also activate or provide the network node 110 with selection mechanisms that may allow the network node 110 and/or the user thereof to make a selection indicating whether the network node 110 has requested the communication session to be initiated with the network resource 120x, information about additional or other network resources 120, and so forth. Once the network node 110 makes a selection, the selection may be transmitted to and received by the network resource optimization system 100 (219). If the network resource optimization system 100 receives a selection indicating that the network node 110 requested the communication session to be initiated or otherwise determine such (221), then the network resource optimization system 100 may initiate the communication session (225). If the network resource optimization system 100 receives a selection indicating that the network node 110 requested information about other or additional network resources 120 instead, the network resource optimization system 100 may send additional resource information to the network node 110 (223). In some embodiments, the network node 110 may request neither the communication session to be initiated nor additional resource information, then the process may terminate.

Although the embodiments described above describe that an automated message may be provided to the network node 110, this may be not required. For example, once a network resource 120 accepts the communication request, the network resource optimization system 100 may initiate a communication session between the network resource 120 and the network node 110 without sending an automated message to the network node 110.

With continued reference to FIG. 2, if the highest ranked network resource 120 is unavailable such that the network resource optimization system 100 may not receive any response, or if the network resource optimization system 100 may otherwise determine that the highest ranked network resource 120 rejected the communication request (215), the network resource optimization system 100 may send the automated message 186 that were sent to the highest ranked network resource 120 to the network resource 120y with the next highest connect score (227) and the process may repeat. In some embodiments, in the event that the network resource optimization system 100 determines that the network node 110 requested a communication session not to be initiated with the highest ranked network resource 120 or specifically requested to communicate with a different network resource 120 other than the highest ranked network resource 120x, the network resource optimization system 100 may then send the automated message 186 that were sent to the highest ranked network resource 120 to the network resource 120y with the next highest connect score (227) and the process may repeat.

The system and method for initiating communication sessions between network nodes 110 and network resources 120 described herein may have numerous applications. For example, the network resources 120 and/or the users thereof may include service providers that may provide a product, a service, or a combination of products and services, and the network nodes 110 or the users thereof may include individuals or entities that may be interested in or may use the product, the service, or the combination of products and services. The system and method described herein may facilitate communication between the network resources 120 and the network nodes 110, thereby facilitating communication between service providers and those that may be interested in the product and/or service provided by the service providers. Details of these and additional examples are provided in U.S. patent application Ser. No. 14/942,829 filed on Nov. 16, 2015, which is incorporated herein by reference in its entirety for all purposes.

Figure 3A:
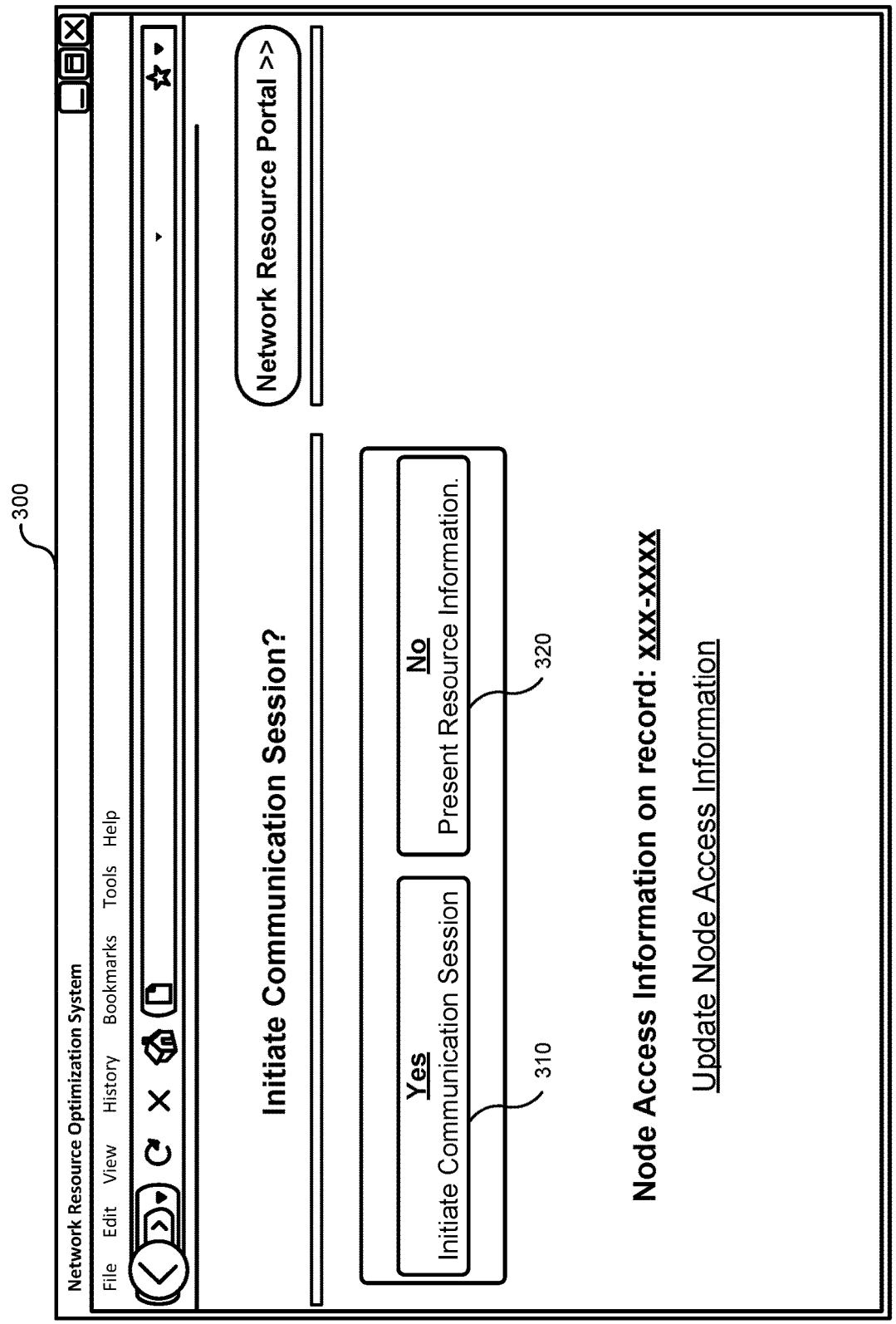
FIGS. 3A and 3B illustrate exemplary user interfaces for initiating communication sessions between network nodes and network resources according to some embodiments of the present disclosure.
Figure 3B:
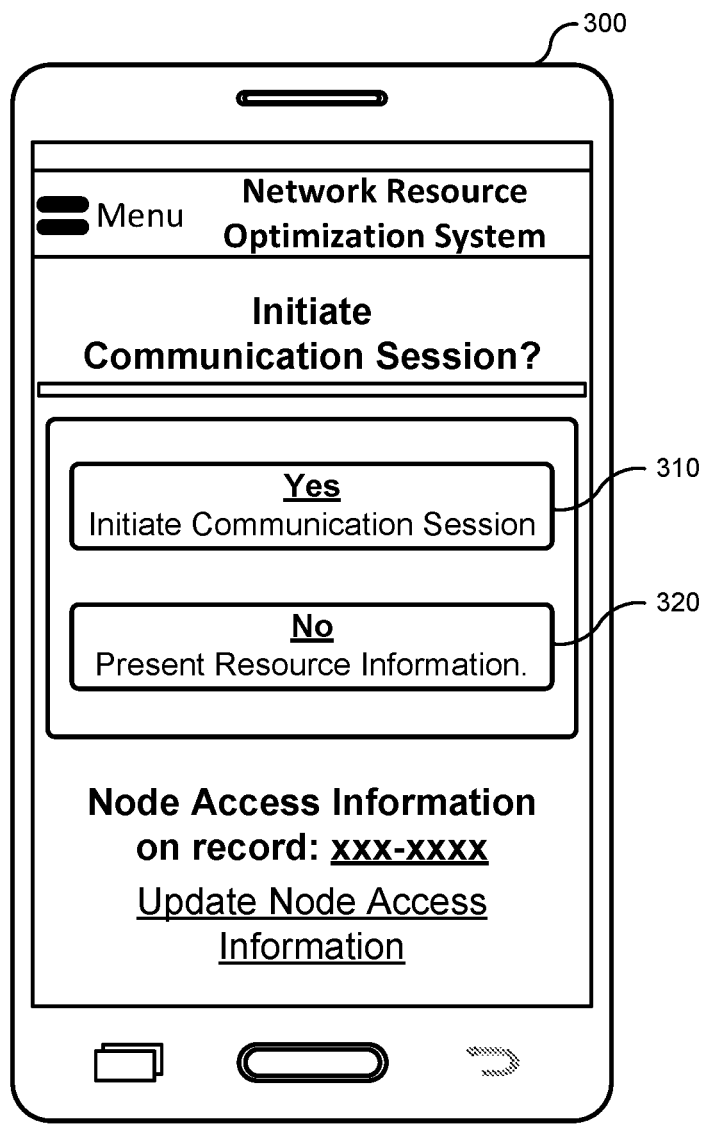

FIGS. 3A and 3B illustrate exemplary user interfaces that may be used to facilitate one or more communication sessions between network nodes 110 and network resources 120 according to one or more embodiments of the present disclosure. The user interfaces may be provided on a number of different computing devices. For example, each user interface may be provided on a web browser of a computing device, such as, for example, a desktop computer, a laptop computer, a tablet computing device and the like. In some embodiments, each user interface may be provided on a mobile computing device. For example, the user interface may be a user interface of a mobile application.

FIG. 3A illustrates an example user interface 300 for facilitating a communication session between a network node 110 and network resources 120. FIG. 3B illustrates a similar user interface 300 that is output on a portable computing device. As the user interface 300 shown in each of FIGS. 3A and 3B may be similar, like reference numbers are used for both figures.

The user interface 300 may be provided to a network node 110 and/or a user thereof that may access a system for initiating communications sessions between network nodes 110 and network resources 120, such as, for example, the network resource optimization system 100 shown and described with respect to FIG. 1. More specifically, the user interface 300 may be used to initiate a communication session between the network node 110 and a network resource 120 in the manner described above with reference to FIG. 2. For example, the user interface 300 may be used to provide the network node 110 and/or the user thereof with a selection mechanism for making a selection to indicate to the network resource optimization system 100 whether a communication session should be initiated with the network resource 120.

More specifically, once the network node 110 has provided information about the network node 110 and the resource requested, the network resource optimization system 100 may provide the user interface 300 to the network node 110. The user interface 300 may include a selection mechanism, which may include a first soft button 310, a second soft button 320, or other such selection mechanism.

The first soft button 310 may enable the network node 110 to be connected with one or more network resources 120 that may be identified, or will be identified, by the network resource optimization system 100 using the various methods described above. The second soft button 320 may enable the network node 110 to opt out of or otherwise decline to be connected with a network resource 120.

The user interface 300 may also include access information 330 of the network node 110. The contact information 330 may be used to indicate how the identified network resource 120 may access the network node 110 should the network node 110 request to be instantly connected with the network resource 120. The user interface 300 may also allow the network node 110 to update access information associated with the network node 110. Other exemplary user interfaces may be utilized. Details of these and additional examples are provided in U.S. patent application Ser. No. 14/942,829 filed on Nov. 16, 2015, which is incorporated herein by reference in its entirety for all purposes.

Figure 4:
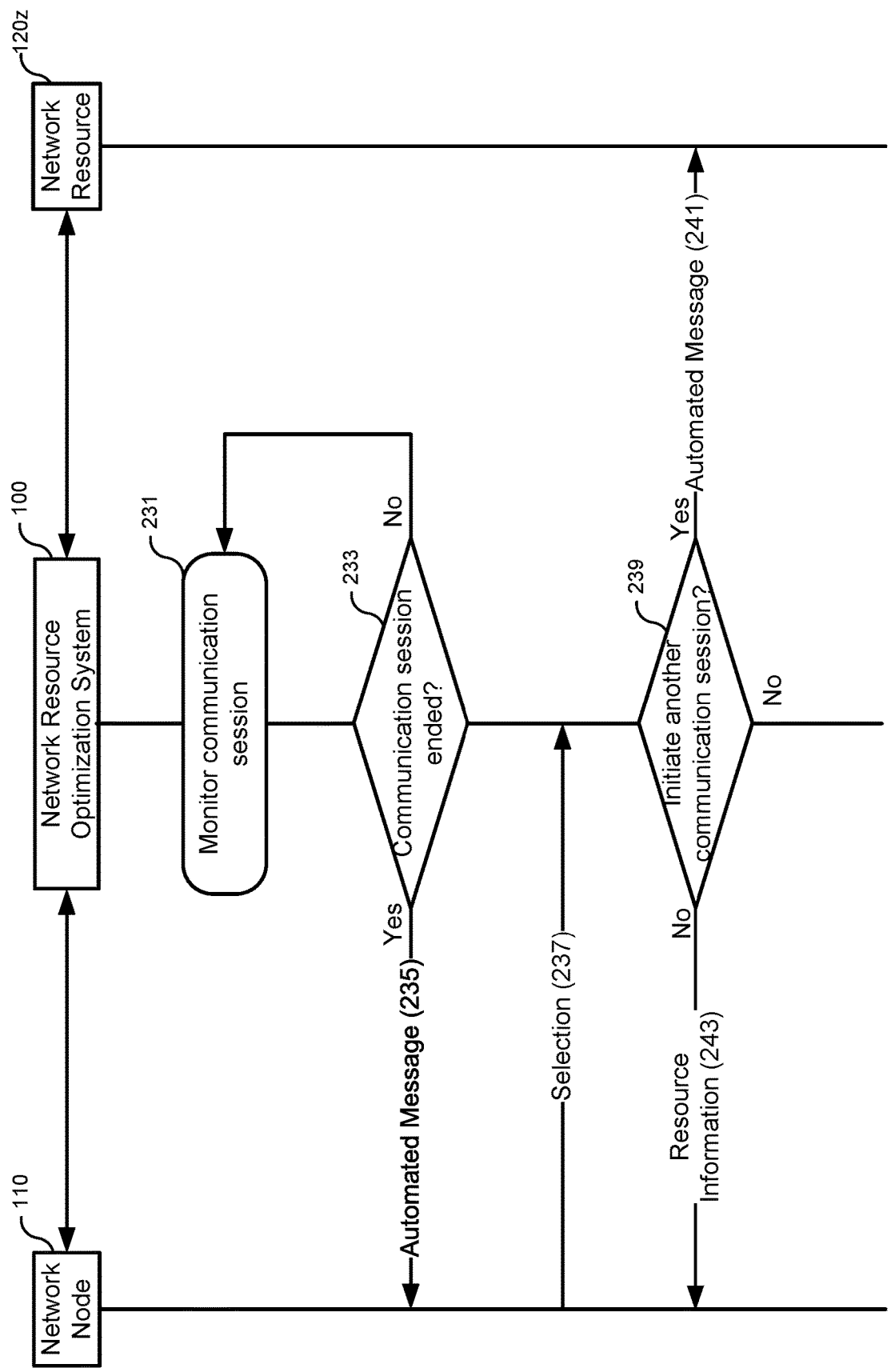
FIG. 4 illustrate a flow chart of additional operations that may be performed in the process illustrated in FIG. 2 for facilitating communication sessions between network nodes and network resources according to some embodiments of the present disclosure.

FIG. 4 illustrate a flow chart of additional operations that may be performed or involved in the process illustrated in FIG. 2 for facilitating communication sessions between network nodes 110 and network resources 120. In some embodiments, once a communication session between a network node 110 and a network resource 120, such the highest ranked network resource 120x or the next highest ranked network resource 120y as discussed above, is initiated, the network resource optimization system 100 may monitor the communication session (231) and determine whether the communication session has ended (233).

If the communication session has ended, then the network resource optimization system 100 may generate and provide an automated message to the network node 110 (235). The transmission of the automated message may activate a selection mechanism at the network node 110. The selection mechanism may allow the network node 110 to, for example, request to be connected with another network resource 120, request information about other or additional network resources 120, provide feedback about the communication session and/or the network resource 120 that just ended, and so on. In some embodiments, the selection mechanism may also allow the network node 110 to provide additional information about the resource requested and/or modify the resource request 112 in view of the earlier communication session(s). The modified resource request 112 may be transmitted to the network resource optimization system 100 along with the selection (237).

Upon receiving the selection, the network resource optimization system 100 may determine that the network node 110 requested to be connected with another network resource 120, then the network resource optimization system 100 may provide the automated message 186 that were provided to the highest and/or the next highest ranked network resources 120x, 120y, to another network resource 120z (241). If the network node 110 updates or provides additional information of the resource request 112, the network resource optimization system 100 may generate and provide an updated automated message 186 incorporating the update or additional information for transmission to the network resource 120z. If the network resource optimization system 100 determines that the network node 110 requested information about additional network resources 120, then the network resource optimization system 100 may provide the network node 110 with additional network resource information (243). If the network resource optimization system 100 determines that the network node 110 requested no further action to be taken or requested no additional information, the process may end.

Figure 5:
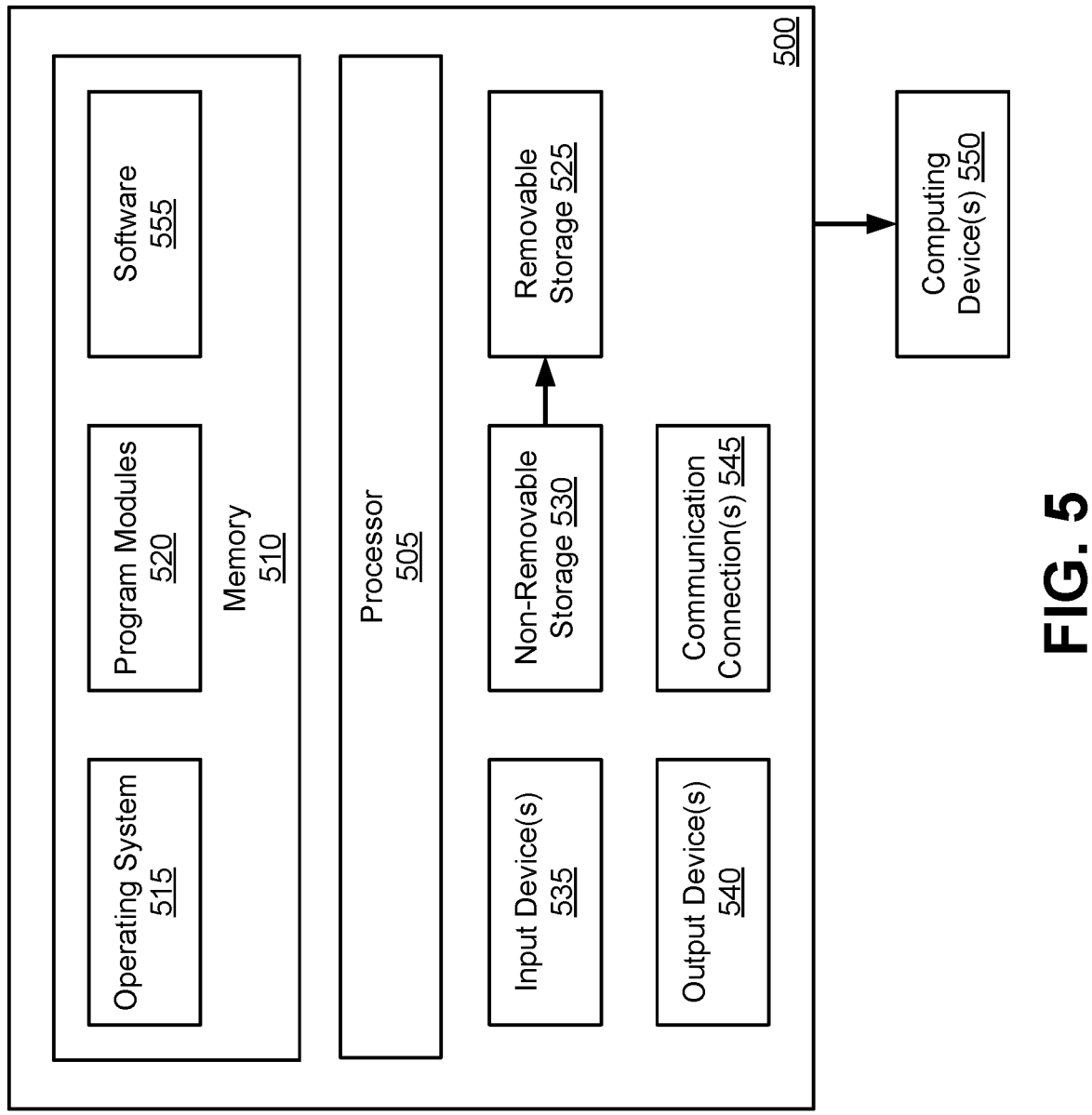
FIG. 5 is a block diagram illustrating a specialized computing device for initiating communication sessions between network nodes and network resources according to some embodiments of the present disclosure.

FIG. 5 is a block diagram illustrating exemplary components, such as, for example, hardware components of a specialized computing device 500 for initiating communication sessions between network nodes 110 and network resources 120, according to one or more embodiments of the present disclosure as described herein. In some embodiments, the specialized computing device 500 may be similar to the computing devices associated with the various network nodes 110 and network resources 120 described above. Further, the specialized computing device 500 may be similar to the server 150 shown and described with respect to FIG. 1. Although various components of the specialized computing device 500 are shown, connections and communication channels between each of the components are omitted for simplicity.

In a basic configuration, the specialized computing device 500 may include at least one processor 505 and an associated memory 510. The memory 510 may include, but is not limited to, volatile storage such as random access memory, non-volatile storage such as read-only memory, flash memory, or any combination thereof. The memory 510 may store an operating system 515 and one or more program modules 520 suitable for running software applications 555. The operating system 515 may be configured to control the specialized computing device 500 and/or one or more software applications 555 being executed by the operating system 515.

The specialized computing device 500 may have additional features or functionality than those expressly described herein. For example, the specialized computing device 500 may also include additional data storage devices, removable and non-removable, such as, for example, magnetic disks, optical disks, or tape. Exemplary storage devices are illustrated in FIG. 5 by removable storage device 525 and a non-removable storage device 530.

In some embodiments, various program modules and data files may be stored in the system memory 510. The program modules 520 and the processor 505 may perform processes that include one or more of the operations of process described above with reference to FIGS. 1-4.

As also shown in FIG. 5, the specialized computing device 500 may include one or more input devices 535. The input devices 535 may include a keyboard, a mouse, a pen or stylus, a sound input device, a touch input device, and the like. The specialized computing device 500 may also include one or more output devices 540. The output devices 540 may include a display, one or more speakers, a printer, and the like.

The specialized computing device 500 also includes communication connections 545 that facilitate communications with additional computing devices 550. Such communication connections 545 may include internet capabilities, a RF transmitter, a receiver, and/or transceiver circuitry, universal serial bus (USB) communications, parallel ports and/or serial ports.

As used herein, the term computer-readable media may include computer storage media. Computer storage media may include volatile and nonvolatile media and/or removable and non-removable media for the storage of information. Examples include computer-readable instructions, data structures, and program modules. The memory 510, the removable storage device 525, and the non-removable storage device 530 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the specialized computing device 500. Any such computer storage media may be part of the specialized computing device 500.

The invention has now been described in detail for the purposes of clarity and understanding. However, it will be appreciated that certain changes and modifications may be practiced within the scope of the appended claims.

What is claimed is:

1. A method for initiating communication between a network node and a network resource, the method comprising:
   receiving, by a network resource optimization system from the network node, a resource request, wherein the resource request includes required resource parameters;
   determining, by the network resource optimization system, a plurality of network resources that satisfy the required resource parameters;
   determining, by the network resource optimization system, a subset of network resources from the plurality of network resources based, at least in part, on a score of each of the plurality of the network resources, wherein the score of each network resource is based, at least in part, on a rate of acceptance of communication requests to be instantly connected with a respective network node that were received by the network resource, wherein the rate of acceptance is calculated based on:
      i) a number of times, historically, the network resource optimization system has provided a communication request to the network resource and
      ii) how often, historically, the network resource accepted the provided communication request and, in response, was instantly connected with the respective network node via a respective communication session initiated by the network resource optimization system;
   selecting, by the network resource optimization system, the network resource from the subset of network resources based, at least in part, on the score of the network resource;
   transmitting, by the network resource optimization system to the selected network resource, a communication request;
   receiving, by the network resource optimization system from the selected network resource, an acceptance of the communication request, wherein receiving the acceptance causes the network resource optimization system to activate a selection mechanism at the network node; and
   receiving, by the network resource optimization system from the network node, a selection made through the selection mechanism, wherein receiving the selection causes the network resource optimization system to initiate a communication session between the selected network resource and the network node.

2. The method for initiating communication between the network node and the network resource of claim 1, further comprising:
   determining, by the network resource optimization system for each network resource of the subset of network resources, a probability of receiving acceptance of the communication request based, at least in part, on:
   the score of each network resource; and
   at least one variable independent from each network resource; and
   wherein selecting the network resource from the subset of network resources is further based, at least in part, on the probability.

3. The method for initiating communication between the network node and the network resource of claim 1, wherein the score of each network resource is a first score of each network resource, the method further comprising:
   determining, by the network resource optimization system for each network resource of the subset of network resources, a probability of receiving acceptance of the communication request based, at least in part, on:
   the first score of each network resource; and
   a second score of each network resource, wherein the second score of each network resource is determined based, at least in part, on:
      a communication target set by the network resource; and
      a number of times communication sessions were established between the network resource and any network node in consequence to accepted communication requests over a given time period; and
   wherein selecting the network resource from the subset of network resources is further based, at least in part, on the probability.

4. The method for initiating communication between the network node and the network resource of claim 1, further comprising:
   accessing, by the network resource optimization system, a calendaring application to determine an availability associated with each of the plurality of the network resources, wherein:
   the calendaring application is accessible at least by the plurality of the network resources; and
   determining, by the network resource optimization system, the subset of network resources from the plurality of network resources is further based, at least in part, on the availability associated with each of the plurality of the network resources.

5. The method for initiating communication between the network node and the network resource of claim 4, wherein determining, by the network resource optimization system, the subset of network resources from the plurality of network resources further comprises:
   scaling, by the network resource optimization system, the score of each of the plurality of the network resources based, at least in part, on the availability associated with each of the plurality of the network resources.

6. The method for initiating communication between the network node and the network resource of claim 4, further comprising:
   updating, by the network resource optimization system in the calendaring application, the availability associated with the selected network resource, in response to initiating the communication session between the selected network resource and the network node.

7. The method for initiating communication between the network node and the network resource of claim 1, further comprising:
   transmitting, by the network resource optimization system to the selected network resource, at least one of the required resource parameters.

8. The method for initiating communication between the network node and the network resource of claim 1, wherein:
   receiving, by the network resource optimization system from the selected network resource, the acceptance of the communication request is caused, at least in part, by a selection made at the selected network resource.

9. The method for initiating communication between the network node and the network resource of claim 8, further comprising:
adjusting, by the network resource optimization system, the score of the selected network resource based, at least in part, on the selection made at the selected network resource.

10. The method for initiating communication between the network node and the network resource of claim 1, further comprising:
selecting, by the network resource optimization system, another network resource from the subset of network resources based, at least in part, on the score of the another network resource; and
transmitting, by the network resource optimization system to the another network resource, s-another communication request.

11. The method for initiating communication between the network node and the network resource of claim 1, further comprising:
determining, by the network resource optimization system, that the communication session between the network resource and the network node has been terminated;
causing, by the network resource optimization system, another selection mechanism to be activated at the network node; and
receiving, by the network resource optimization system from the network node, a selection made through the another selection mechanism, wherein:
receiving the selection made through the another selection mechanism causes the network resources optimization system to initiate another communication session between another network resource and the network node.

12. The method for initiating communication between the network node and the network resource of claim 1, further comprising:
selecting, by the network resource optimization system, another network resource based, at least in part, on the score of the another network resource; and
wherein:
the score of the network resource is above a threshold value; and
the score of the another network resource is below the threshold value.

13. A network resource optimization system for initiating communication between a network node and a network resource, the network resource optimization system comprising:
one or more processors; and
a non-transitory machine readable medium having instructions stored thereon for initiating communication between the network node and the network resource, wherein the instructions, when executed, cause the one or more processors to perform operations comprising:
receiving, from the network node, a resource request;
parsing the resource request to determine required resource parameters;
determining a plurality of network resources that satisfy the required resource parameters;
determining a subset of network resources from the plurality of network resources based, at least in part, on a score of each of the plurality of the network resources, wherein the score of each network resource is based, at least in part, on a rate of acceptance of communication requests to be instantly connected with a respective network node that were received by the network resource the rate of acceptance being calculated based on:
i) a number of times, historically, the network resource optimization system has provided a communication request to the network resource and
ii) how often, historically, the network resource accepted the provided communication request and, in response, was instantly connected with the respective network node via a respective communication session initiated by the network resource optimization system; and
transmitting, to each of at least two network resources of the subset of network resources, a communication request based, at least in part, on the score of each of the at least two network resources of the subset of network resources.

14. The network resource optimization system for initiating communication between the network node and the network resource of claim 13, wherein the instructions, when executed, further cause the one or more processors to perform operations comprising:
receiving, from each of the at least two network resources, an acceptance of the communication request, wherein receiving the acceptance causes the network resource optimization system to activate a selection mechanism at the network node; and
receiving, from the network node, a selection made through the selection mechanism, wherein receiving the selection causes the network resources optimization system to initiate a communication session between at least one of the at least two network resources and the network node.

15. The network resource optimization system for initiating communication between the network node and the network resource of claim 13, wherein the instructions, when executed, further cause the one or more processors to perform operations comprising:
determining, by the network resource optimization system, a probability of receiving, by the network resource optimization system from each network resource of the subset of network resources, acceptance of the communication request, wherein:
transmitting, by the network resource optimization system to each of the at least two network resources of the subset of network resources, the communication request is further based, at least in part, on the probability associated with each network resource of the subset of network resources.

16. A non-transitory machine readable medium having instructions stored thereon for initiating communication between a network node and a network resource, wherein the instructions are executable by one or more processors of a network resource optimization system for at least:
receiving, from the network node, a resource request;
parsing the resource request to determine required resource parameters;
determining a plurality of network resources that satisfy the required resource parameters;
determining a subset of network resources from the plurality of network resources based, at least in part, on a score of each of the plurality of the network resources, wherein the score of each network resource is based, at least in part, on:

a rate of acceptance of communication requests to be instantly connected with a respective network node that were received by the network resource, the rate of acceptance being calculated based, at least in part on i) a number of times, historically, the network resource optimization system has provided a communication request to the network resource and ii) how often, historically, the network resource accepted the provided communication request and, in response, was instantly connected with the respective network node via a respective communication session initiated by the network resource optimization system; and a global rate of acceptance of communication requests received by the plurality of network resources;

selecting a candidate network resource from the subset of network resources based, at least in part, on the score;

transmitting, to the candidate network resource, a communication request;

receiving, from the candidate network resource, an acceptance of the communication request, wherein receiving the acceptance causes the one or more processors to activate a selection mechanism at the network node; and receiving, by the one or more processors from the network node, a selection made through the selection mechanism, wherein receiving the selection causes the one or more processors to initiate a communication session between the candidate network resource and the network node.

17. The non-transitory machine readable medium having instructions stored thereon for initiating communication between the network node and the network resource of claim 16, wherein:

the score of each network resource is based, at least in part, on weighting the rate of acceptance and the global rate of acceptance based, at least in part, on a total number of communication requests received by the network resource.

18. The non-transitory machine readable medium having instructions stored thereon for initiating communication between the network node and the network resource of claim 16, wherein the instructions are further executable by the one or more processors for at least:

calculating a probability of receiving, from each network resource of the subset of network resources, acceptance of the communication request based, at least in part, on:
the score of each network resource; and
a random number; and wherein selecting the network resource from the subset of network resources is further based, at least in part, on the probability.

19. The non-transitory machine readable medium having instructions stored thereon for initiating communication between the network node and the network resource of claim 18, wherein:

a volatility of the random number with respect to each network resource is related to a number of times communication sessions were established between the network resource and any network node.

20. The non-transitory machine readable medium having instructions stored thereon for initiating communication between the network node and the network resource of claim 18, wherein:

a volatility of the random number with respect to each network resource is inversely related to a number of times communication sessions were established between the network resource and any network node.

* * * * *